June 23, 1942.    R. J. ROLAND    2,287,196
CONVEYER
Filed April 17, 1941

INVENTOR.
Robert J. Roland
BY
ATTORNEY

Patented June 23, 1942

2,287,196

UNITED STATES PATENT OFFICE 2,287,196

CONVEYER

Robert J. Roland, Cincinnati, Ohio, assignor to The Alvey-Ferguson Company, Cincinnati, Ohio, a corporation of Ohio Application April 17, 1941, Serial No. 389,032

6 Claims. (Cl. 198—168)

This invention relates to improvements in conveyers, primarily combining a roller conveyer and a trolley conveyer in which the roller conveyer sustains and provides an anti-friction track for the articles conveyed by the trolley conveyer disposed alongside of the track and suspendingly sustaining guided radial arms, each projected to centrally abuttingly engage the rear end of the articles for translation upon the roller conveyer or track.

The conveyer or transporting track is represented as a commercial roller type, comprising spaced rollers journalled between suitable framing, and providing a guide for the articles conveyed. Other types of tracks suitable for specific service requirements may be utilized, known as a plane surfaced slider or skid type for sustaining the articles during transit. The transporting courses preferably are disposed in a level plane, although they may include inclined sections for transporting the articles from one elevation to another.

The means for translating or transporting the articles upon the track, preferably constitutes a trolley type of conveyer embodying a track superstructure for sustaining trolleys relatively spaced and in connection with a conveyer chain suspendingly sustained upon the superstructure by the trolleys to form a part thereof.

It therefore is an object of the invention to provide a conveyer system consisting of a roller type of conveyer track, and a trolley type of conveyer disposed alongside of the track, the trolleys carrying radial arms, each adapted for extending over the track to abuttingly engage the article to be transported upon the track.

Another object is to provide a conveyer system having a series of radial arms carried by chain conveyed trolleys, the arms guidingly sustained against lateral displacement for abuttingly engaging and propelling articles disposed upon tracks, arranged upon either one or opposite sides of the trolley conveyer, with the arm transferable for use in connection with either of the tracks, or to dispose the same to an inactive position.

Various other features and advantages of the invention will be more fully set forth in a description of the accompanying drawing, in which.

Figure 1:
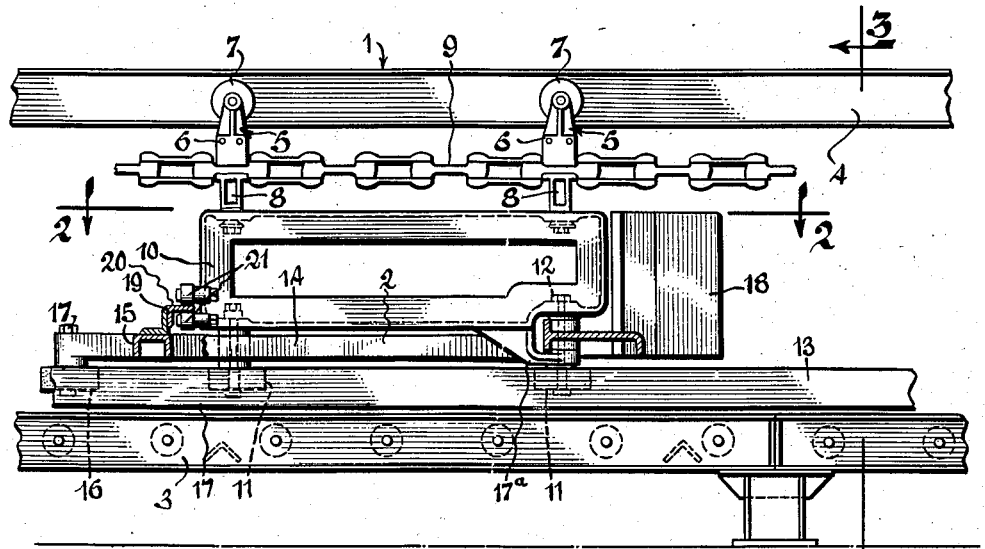
Figure 1 is a side elevation of a section of the improved conveyer.

The conveyer system is particularly adaptable for ammunition plants for conveying shells, usually disposed within a skid or container for conveyance from one division or department to another for shell loading or otherwise. To reduce explosion hazards in transporting, it is desirable to move the containers upon an anti-friction track, and to have the batches separated a determined distance from one another while en route.

The improved structure constitutes a radial pusher arm, pivotally mounted upon a trolley suspended carriage to adapt it to be shifted into alternate positions to extend either from one side or the other of the trolley conveyer, to dispose the arm in an active position with either one of a pair of adjacent tracks or into and out of commission for a single track.

The conveyor comprises a conventional trolley type of conveyer 1, carrying a plurality of radial arm pushers 2 disposed appropriately above a roller conveyer 3. The drawing shows only a section of the conveyer and a single trolley suspended radial arm sufficient for the purposes herein, it being understood that a number of radial arms are employed for a conveyer system, depending upon the requirements for a given length of system; and each arm is arranged to contact abuttingly the rear end of the article to be conveyed centrally of the roller conveyer or track.

The trolley conveyer structurally may follow any suitable conventional practice, and in the present instance, as illustrated, comprises an I-beam 4 as a track superstructure for supporting a plurality of trolleys or hangers 5, each constituting a bracket 6 carrying a set of rollers 7 tracked upon opposite sides of the lower flanges of the I-beam 4. The brackets are preferably of sectional form, the sections bolted or otherwise secured together and to the upper end of a spacer block 8 extending from the bracket through a link in the drive chain 9 for sustaining the chain and for anchoring a carriage 10 beneath the chain.

The carriage 10 constitutes a rectangular frame, vertically disposed, and is provided with guide rollers 11 at its lower side suitably journalled upon a vertical axis and at the fore and aft ends of the carriage to guide and stabilize the carriage in its vertical position against the weight of an extended radial arm 2, pivotally mounted upon the carriage, and to overcome any twisting tendency imparted by pressure exerted against the articles propelled by the radial arm. The rollers 11 are engaged in a channel formed of a pair of guide rails 13 in the present instance in the form of angle irons, spaced to appropriately track the rollers disposed therebetween.

The drive chain 9 is of endless form, and driven from any suitable source in a well known manner. A pair of trolleys are employed for each carriage connecting with the carriage respectively at the fore and aft ends thereof.

Each radial arm 2 generally is in the form of an isosceles triangle, constituting a pair of limbs 14 of equal length, joined by a transverse connecting section or bar 15. The forward ends of the respective limbs 14 project slightly beyond the cross bar 15, and thereby are of yoke form, with the projecting ends thereof each provided with a roller 16 suitably journalled upon a spindle 17, one end for projecting over the central portion of the track to engage the article to be transported, and the second for positioning its guide roller within the guideway formed by the rails 13 as a part of the trolley conveyer.

Figure 2:
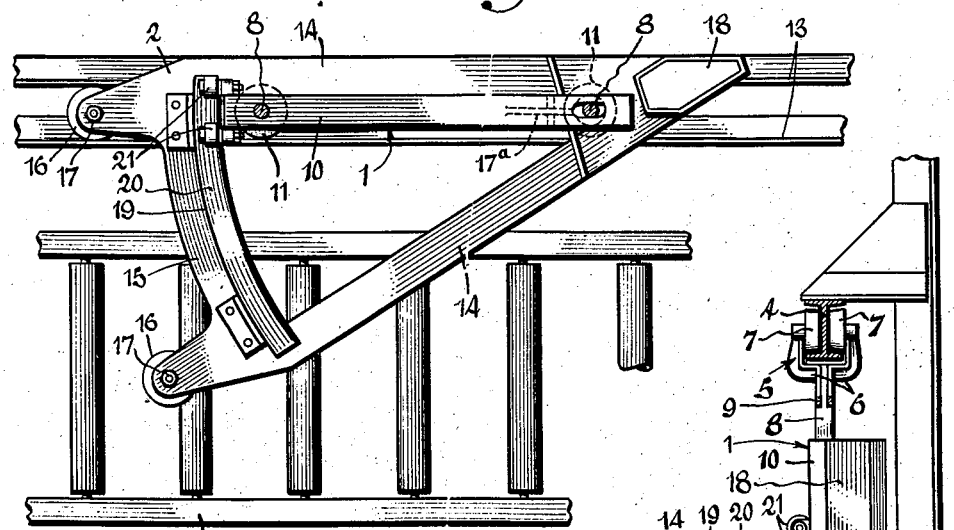
Figure 2 is a section taken on line 2—2, Figure 1, illustrating the radial pusher arm and guide assembly in top plan view.
Figure 3:
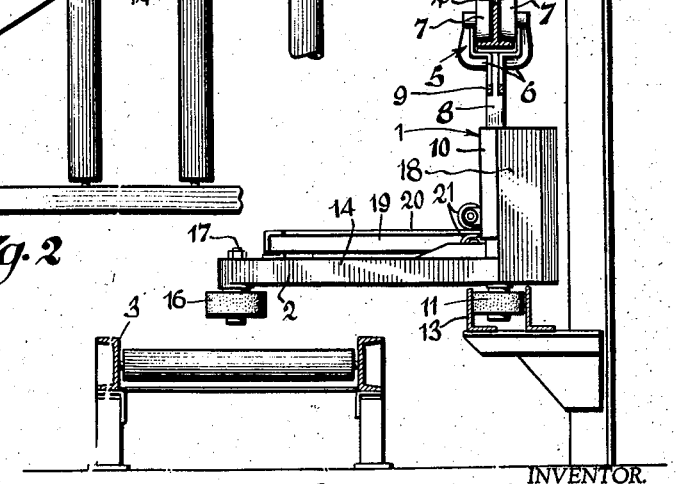
Figure 3 is a sectional view taken on line 3—3, Figure 1.

The intersecting ends of the limbs 14 or rear end of the arm is pivotally mounted upon a pivot bolt 12, which likewise journals the rear guide roller 11 of the carriage traversing in the guideway. The pivot end of the arm is interposed between the lower end of the carriage and a bracket 17a as a part of the carriage. This permits the arm to be shifted to alternate positions one of which is shown as the operating position in Figure 2. The arm is shown swung to one side of the trolley conveyer, disposing one of the rollers 16 appropriately in the center of the roller track 3 for engaging and transporting an article with the other or second roller 16 engaged within the guideway formed by the rails 13 to sustain the radial arm against lateral shift or displacement.

The rear end of the arm is provided with a counterweight 18 is the form of a tail-piece trailing the carriage, and normally is disposed at on or off side of the longitudinal center of the trolley conveyer, to stabilize the arm.

The cross bar 15 of the arm has a curved or arc form of rail 19 fixed upon the upper side thereof. The rail provides a lateral flange 20 engaged and traversing between pairs of guide rollers 21, journalled at opposite sides of the front end of the carriage 10 for sustaining the forward end of the radial arm, and permitting the arm to be easily swung to its alternate positions.

The radial arm is arranged to function at either side of the guideway of the trolley conveyer, and for this purpose the guideway at intervals is provided with interruptions to clear a guide roller 16 from the guideway for shifting the arm to alternate the position of the yoke ends thereof relatively into and out of the guideway, and into cooperation with one of a pair of tracks at opposite sides of the trolley conveyer. This also permits the radial arm to be shifted out of commission when serving a single roller conveyer disposed along one side of the trolley conveyer.

The bracket 17a depending from the carriage extends through the crotch in the arm, and thereby limits the swing of the arm, so that its forward end can not be disengaged from its supported articulated connection with the carriage.

The interchangeability of the radial arm is of advantage in installations requiring the arms to remain in a fixed position permanently as well as in instances where the shiftable feature is desired. The conveyer system can be adapted for either operation by making the guideway continuous in one instance, or by providing interruptions at desired points or stations where a shift of the radial arm is desired.

The radial arm guide rollers at the fore and aft ends of the arm together with the counterweight stabilize the arm independent of the carriage and trolley conveyer, relieving the carriage and its trolley of any lateral deflection or strain imparted upon the arm in transporting heavy loads. Likewise, the lower end or base of the carriage is sustained against lateral displacement by the guideway. This eliminates canting of the trolley, so that its freedom of traverse is not impaired.

The rollers 11 and 16 may be of rubber, or provided with rubber treads, to offer a slight yield, and the arm rollers serving as buffers in engaging with the article to be transported upon the track.

Having described my invention, I claim:

1. A conveyer system, comprising: a roller conveyer and a trolley conveyer adjoiningly arranged, the trolley conveyer having a radial arm for contacting and translating an article upon the roller conveyer, a carriage suspended from said trolley conveyer traversing a guideway of the trolley conveyer, said radial arm being mounted upon said carriage and extended horizontally over the roller conveyer for engagement with an article upon said roller conveyer for translating the same, said arm traversing said guideway to sustain the same against lateral displacement.

2. A conveyer system, comprising: a track, a trolley conveyer adjoining said track, having a radial arm for contacting and translating an article upon the track, a carriage suspended from said trolley conveyer, its lower end traversing a guideway of the trolley conveyer, and a radial arm pivotally mounted upon said carriage and normally extended horizontally over the roller conveyer for engagement with an article upon said roller conveyer for translating the same, and transferable to position from and clearing the track.

3. A conveyer system, comprising: a track, a trolley conveyer adjoining said track, having a radial arm for contacting and translating an article upon the track, a carriage suspended from said trolley conveyer traversing a guideway of the trolley conveyer, and a radial arm mounted upon said carriage and extended for engagement with an article upon said track for translating the same, said arm traversing said guideway to sustain the same against lateral displacement, and arranged to be shifted for transporting articles upon a second track at an opposite side of the trolley conveyer.

4. In a conveyer, a track for transportingly supporting articles, a trolley type of conveyer arranged alongside the track, a track guided carriage sustained and conveyed by said trolley conveyer, having a radial arm pivoted at one end upon the carriage, and at its opposite end slidably sustained upon the carriage, the arm having a portion thereof projected over the track for engaging with and transporting an article on said track.

5. In a conveyer, a track for transportingly supporting articles, a trolley type of conveyer arranged alongside the track, a track guided carriage sustained and conveyed by said trolley conveyer, a radial arm of yoke form pivoted at its tail end to said carriage and at its forward end slidably sustained thereon, its forward end providing a pair of spaced extremities, each journalling a roller, one for guidingly tracking the arm, and the second overhanging the track for engagement with and transporting an article upon said track.

6. In a conveyer, a track for transportingly supporting articles, a trolley type of conveyer arranged alongside the track, a track guided carriage sustained and conveyed by said trolley conveyer, having a radial arm pivoted at one end upon the carriage and counterweighted, and at its opposite end slidably sustained upon the carriage, the arm having a portion thereof projected over the track for engaging with and transporting an article on said track.

ROBERT J. ROLAND.